United States Patent
Boerger (10) Patent No.: US 7,822,997 B2
(45) Date of Patent: Oct. 26, 2010

(54) MAKING A STORAGE DEVICE UNUSABLE UNTIL A REQUEST IS PROVIDED TO RECOVER AN OPERATING SYSTEM OR SYSTEM FIRMWARE

(75) Inventor: Paul Boerger, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 675 days.

(21) Appl. No.: 11/830,960

(22) Filed: Jul. 31, 2007

(65) Prior Publication Data

US 2009/0037750 A1 Feb. 5, 2009

(51) Int. Cl.
*G06F 1/00* (2006.01)
(52) U.S. Cl. ..................................... 713/300
(58) Field of Classification Search ............... 713/300
See application file for complete search history.

(56) References Cited

U.S. PATENT DOCUMENTS

| 6,845,464 | B2 | 1/2005 | Gold |
| 7,000,231 | B1 * | 2/2006 | Gold ........................... 717/174 |
| 7,219,221 | B2 * | 5/2007 | Chao ............................. 713/2 |
| 7,370,234 | B2 * | 5/2008 | Stakutis et al. ................ 714/15 |
| 2002/0162052 | A1 | 10/2002 | Lewis |
| 2003/0182527 | A1 * | 9/2003 | Witt, Jr. ....................... 711/163 |
| 2006/0206643 | A1 * | 9/2006 | Tran et al. .................... 710/100 |
| 2008/0168310 | A1 * | 7/2008 | Saretto et al. ................. 714/30 |

FOREIGN PATENT DOCUMENTS

| KR | 10-2000-0027590 | 5/2000 |
| KR | 10-2006-0005158 | 1/2006 |

* cited by examiner

*Primary Examiner*—Thomas Lee
*Assistant Examiner*—Mohammed H Rehman (57) ABSTRACT

A system comprises a storage device comprising code that is executable to cause recovery of at least one of an operating system and system firmware. Logic coupled to the storage device is also provided to cause the storage device to be unusable until a request is provided to recover at least one of the operating system and system firmware.

20 Claims, 7 Drawing Sheets

MAKING A STORAGE DEVICE UNUSABLE UNTIL A REQUEST IS PROVIDED TO RECOVER AN OPERATING SYSTEM OR SYSTEM FIRMWARE

BACKGROUND

Some electrical systems are "headless" meaning that a user input device such as a keyboard, mouse, trackball, etc. is not used with the system. In fact, some headless devices do not have electrical connection points (e.g., ports) to which such typical types of user input devices could be connected. One example of a headless system is network attached storage (NAS) device such as may be used in a home-based computing environment.

Some headless systems, however, comprise operating systems and system firmware that may become inoperative. Without the aforementioned typical user input devices, recovery from such failures is problematic. Further, to the extent operating system and system firmware recovery mechanism are implemented, such mechanisms should be secure.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
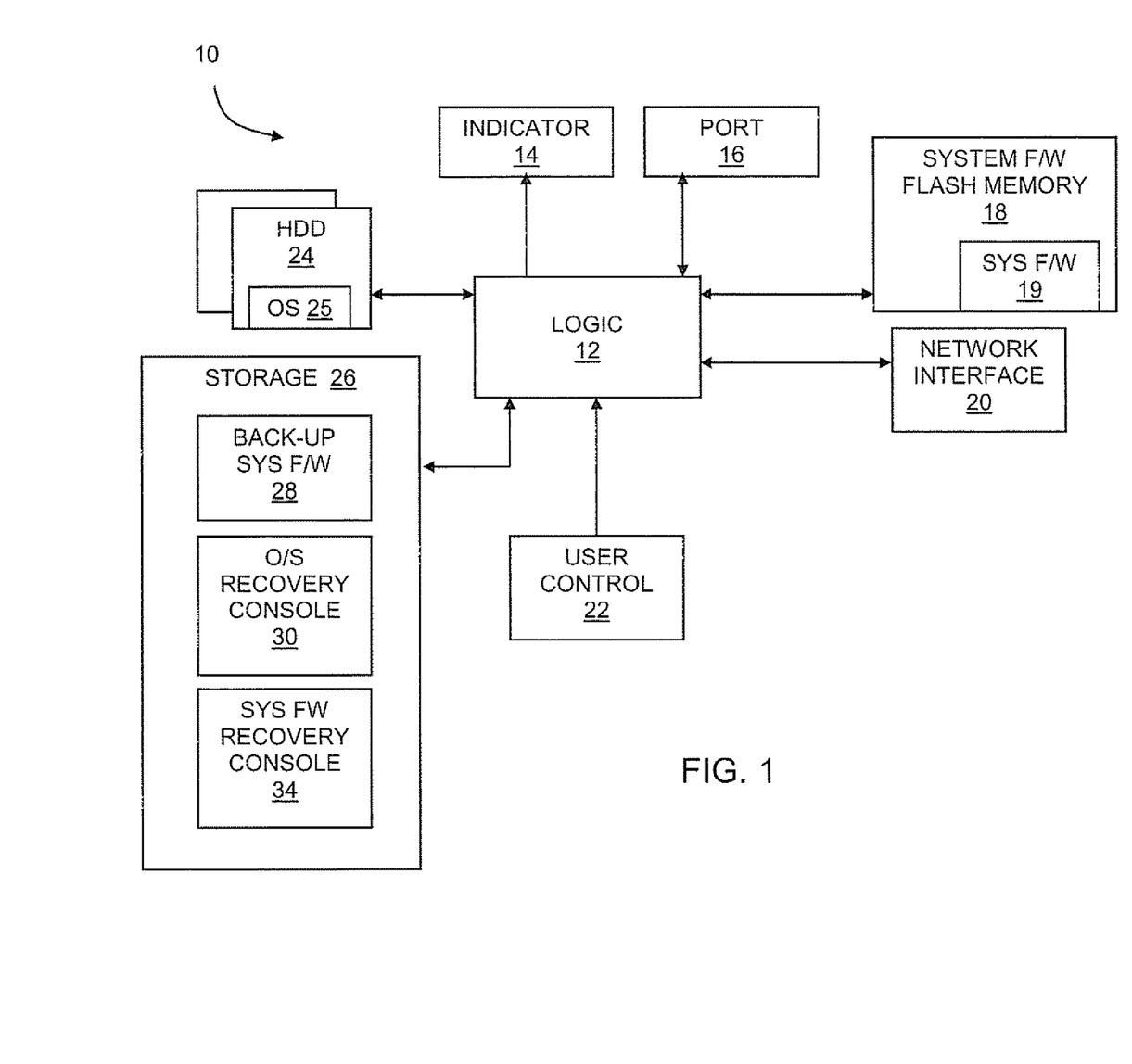
FIG. 1 shows a system in accordance with various embodiments.

FIG. 1 illustrates a system 10 in accordance with various embodiments. The system 10 of FIG. 1 comprises logic 12 coupled to an indicator 14, a port 16, storage 18 (e.g., Flash memory) in which system firmware 19 is stored, a network interface 20, a user control 22, storage 26 and one or more non-volatile storage devices 24 (e.g., hard disk drives (HDDs)). The logic 12 comprises, in some embodiments, a processor. In at least some embodiments, the system 10 is a "headless" system meaning, in some embodiments, that the system has no connections for connecting a computer input device (e.g., keyboard, mouse, trackball, etc.) or a computer monitor. In other embodiments, headless means that, while ports are provided for such standard input and output devices, no such input and output devices are coupled to or used with the system.

In some embodiments, the system 10 comprises a network attached storage (NAS) device. The HDDs 24 are used to store data for a user. The NAS device has network connectivity and thus comprises its own network address (as opposed to being attached to a computer and thus accessible only via the attached computer). The NAS device's files and administrative controls are accessible via other network devices for the purposes of file sharing and administration.

The system firmware 19 comprises code that is executable by the logic 12 (e.g., a processor). The system firmware 19 performs various functions. At least one function is to conduct a power on/self-test (POST) of the system 10 during initialization. For example, the system firmware tests memory, identifies the hardware installed in the system, etc. The system firmware also provides a software interface to various devices within the system following system initialization. In various embodiments, system firmware is also referred to as a basic input/output system (BIOS), boot monitor, and boot loader.

The storage 18 in which the system firmware 19 is stored is re-writeable. Accordingly, updated versions of the system firmware can be written to the storage 18 to overwrite the existing version of system firmware provided in storage 18. For example, if the system firmware becomes corrupted, the logic 12 can overwrite the corrupted system firmware with a new version of system firmware (a process referred to as "recovering" the system firmware).

In at least some embodiments, the storage 26 comprises non-volatile storage such as Flash memory, read only memory (ROM), etc. In some embodiments, the storage 26 comprises a universal serial bus (USB)-based device. The storage 26 stores a back-up copy 28 of system firmware along with an OS recovery console 30 and a system firmware recovery console 34. The OS recovery console 30 and system firmware recovery console 34 comprise code executable by the logic 12 to assist in performing operating system and system firmware recovery, respectively, and will be described below.

In at least some embodiments, the contents of the storage 26 can be accessed and viewed by a client device (e.g., a computer) coupled to the system 10 via the network interface 20. For example, storage 26 may be displayed on the client device as a network-accessible USB storage device. Because, the contents of the storage 26 is accessible to a client device, the security of the storage 26 and its contents may be compromised. In accordance with various embodiments, the storage 26 is made unusable, and thus inaccessible and inoperative, until a request is provided to recovery the operating system or system firmware. While unusable, the contents of the storage 26 cannot be viewed or accessed by a user of a client device, thereby ensuring the security of the storage 26. As such, the back-up system firmware 28, operating system recovery console 30 and system firmware recovery console 34 are unusable and inaccessible, thereby helping to ensure the security of the system from, for example, viruses and other forms of unauthorized attacks or unintended consequences (e.g., a user that mistakenly causes an unintended action to be performed with regard to the contents of the storage 26).

Figure 1A:
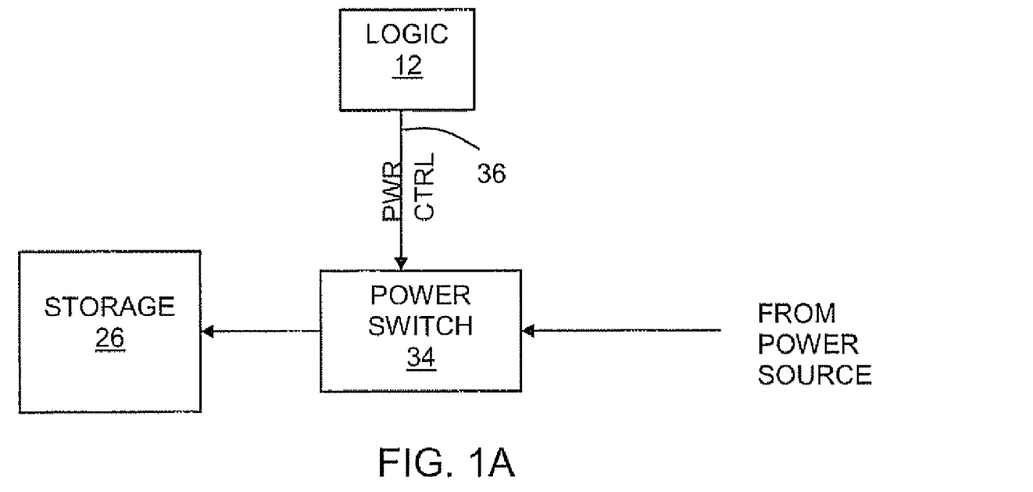
FIGS. 1A-1C show various embodiments of selectively rendering a storage device available.

FIGS. 1A-1C illustrate various embodiments of selectively rendering the storage 26 unusable. In FIG. 1A, electrical power from a power source is provided to the storage 26 via a power switch 34. Power switch 34 may comprise one or more transistors. The power switch 34 receives a power control (PWR CTRL) signal 36 from the logic 12. The power control signal 36 is asserted by the logic 12 to one state (e.g., logic low) to turn off the power switch 34 thereby preventing power from the power source from reaching the storage 26. In this state, the storage 26 is powered off and thus is unusable for its intended purpose (e.g., providing its contents to an entity that reads its contents). The power control signal 36 is asserted by logic 12 to another state (e.g., logic high) to turn on the power switch 34 to thereby turn power on to the storage 26. In this state, the storage 36 is powered on and thus is usable for its intended purpose.

Figure 1B:
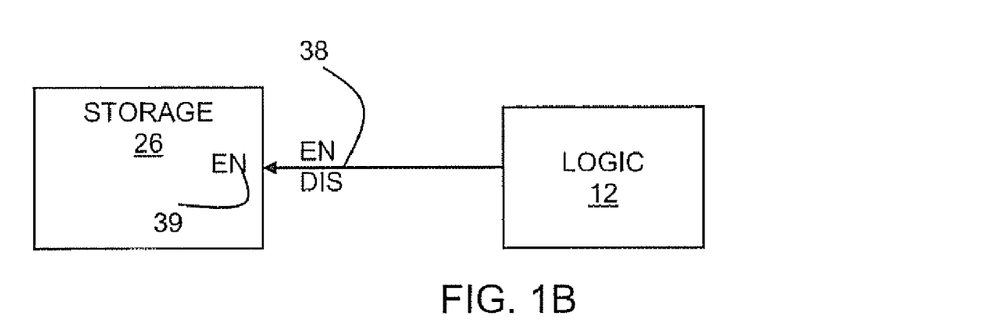

FIG. 1B illustrates an embodiment in which the storage 26 has an enable (EN) input terminal 39 and logic 12 asserts an enable/disable (EN/DIS) control signal 38 to the storage 27. The EN input terminal 39 comprises a chip select (CS) or similarly functioning input control terminal. When the EN input terminal 39 is forced to one logic state (e.g., logic high), the storage 26 is disabled from being accessed (i.e., reads and/or writes cannot complete). However, when the EN input terminal 39 is forced to another logic state (e.g., logic low), the storage 26 is enabled (i.e., reads and/or writes can complete). In the embodiment of FIG. 1B, the storage 26 is powered on, but selectively enabled and disabled via the EN input terminal 39.

Figure 1C:
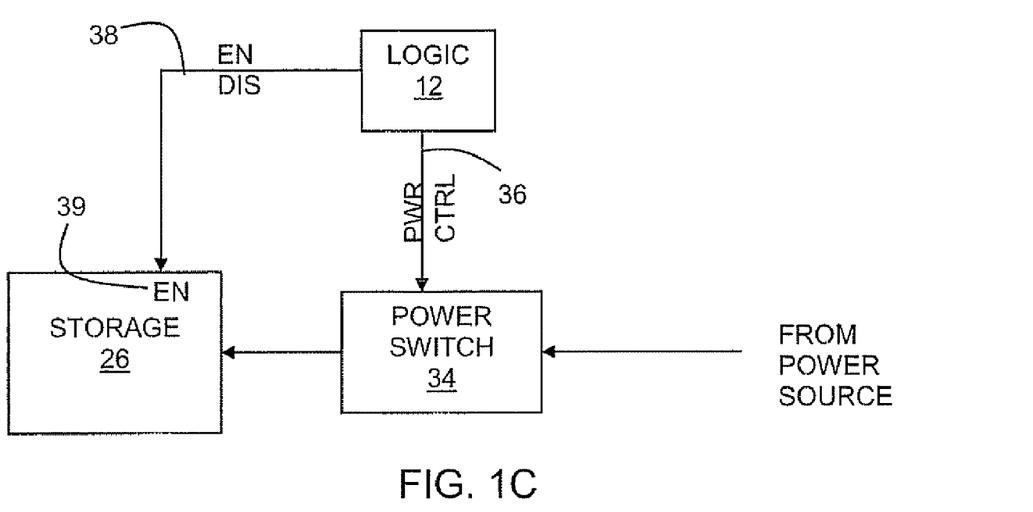

FIG. 1C illustrates another embodiment which combines the features of FIGS. 1A and 1B. In FIG. 1C, the storage 26 is selectively made available and unavailable by either or both mechanisms. That is, the logic 12 has control over the state of the storage 26 by controlling the power state of storage 26 via the power switch 34 and/or by enabling/disabling the storage's EN input terminal 39.

Figure 2:
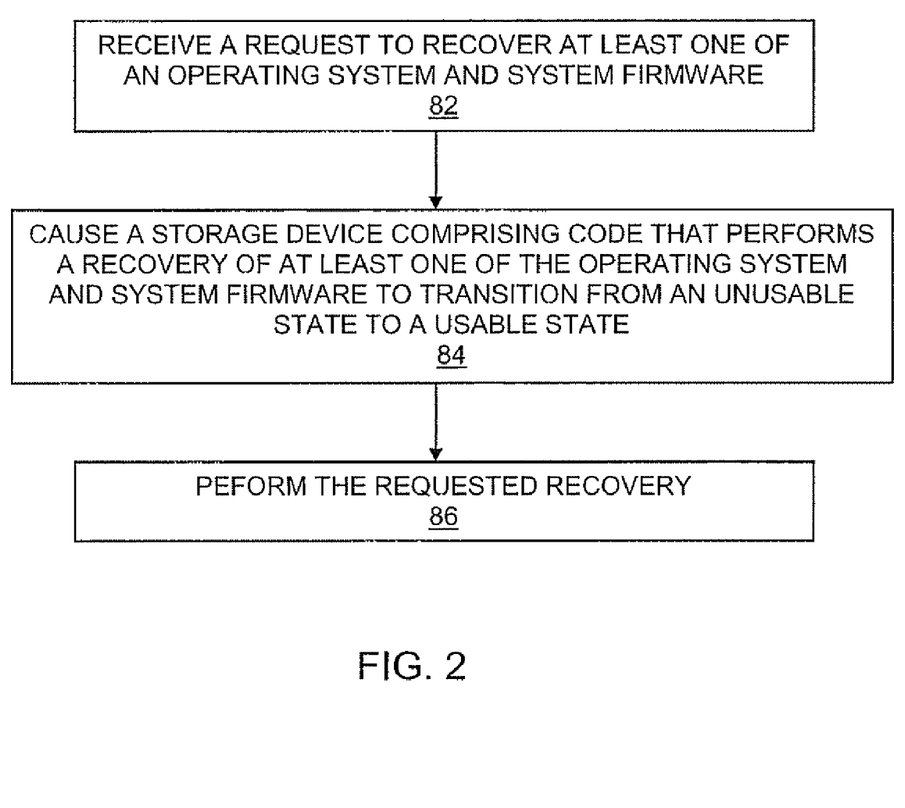
FIG. 2 illustrates a method operable on the system of FIG. 1

FIG. 2 illustrates a method in accordance with various embodiments. At 82, a request is received to recover at least one of the operating system and the system firmware. The request may comprise detecting user input from user control 22 which, as explained below, does not comprise a typical computer input device such as a keyboard, mouse or trackball. At 84, the method of FIG. 2 comprises causing a storage device comprising code that performs a recovery of at least one of the operating system and system firmware (e.g., storage 26) to transition from its currently unusable state to a usable state to thereby enable its contents to be used in the requested recovery process. At 86, the method further comprises performing the requested recovery process. Additional detail is provided below.

Referring again to FIG. 1, the back-up copy 28 of the system firmware is normally not used and, instead, the system 10 operates using the system firmware 19 in storage 18. The system 10, however, can perform a system firmware recovery process in which the back-up copy 28 of system firmware is used instead of the system firmware in the storage 18.

In one embodiment, the system firmware recovery process comprises the logic 12 overwriting the system firmware 19 in flash memory 18 with the back-up copy 28 from the storage 26, and then using the newly overwritten system firmware 19 in storage 18 to perform the functionality consistent with the system firmware. In another embodiment, the system firmware recovery process comprises the logic 12 redirecting its use of system firmware from the firmware 19 in storage 18 to the firmware 28 in storage 26. In this latter embodiment, the system firmware in storage 18 is not overwritten and the logic 12 accesses and, instead, executes the alternative copy 28.

Referring still to FIG. 1, the indicator 14 comprises a status indicator. In various embodiments, the indicator 14 does not comprise a computer monitor. For example, indicator 14 does not comprise a video graphics adapter (VGA) monitor or any other type of display usable by a user of a computer to interact with executing applications (e.g., email, word processing, etc.). In some embodiments, the indicator 14 comprises a light emitting diode (LED). The indicator may be operable by the logic 12 to illuminate different colors (e.g., blue and red) and/or different blinking patterns. Examples of blinking patterns comprise an alternating pattern of different colors, an on/off pattern, etc.

The user control 22 comprises a user-actuatable input device to perform system firmware recovery, operating system recovery and to cause status information to be indicated via the indicator 14. In at least some embodiments, the user control 22 does not comprise a "QWERTY" keyboard, a mouse, a trackball, or other type of user input device by which a user would operate a computer to interact with an application executing on the computer (e.g., email, word processing, etc.). In some embodiments, the user control 22 comprises a button switch. Further still, the user control may comprise a button that resides within a recess in outer surface of a housing containing the electronics comprising the system 10. In some embodiments, the recess within which the button resides is substantially smaller than the diameter of the tip of a human finger. Consequently, as a recessed button, the user control 22 is incapable of being pressed by a user without a button assistance device. An example of a button assistance device comprises a straightened out paperclip. In such embodiments, the user control 22 cannot be accidentally pressed by a user.

The HDDs 24 of the system 10 store a primary operating system (OS) 25. The primary operating system 25 comprises a software interface on which various applications execute. In some embodiments, the primary operating system 25 comprises a WINDOWS® operating system from Microsoft Corp.

The port 16 shown in FIG. 1 comprises a connection point for a removable storage device to be communicatively coupled to the system 10. In some embodiments, the port 16 comprises a universal serial bus (USB) port to which a USB-compliant storage device can be mated.

The network interface 20 comprises, for example, an Ethernet interface by which the system 10 can communicatively couple to a local area network (LAN) or a wide area network (WAN). Through the network interface 20, system 10 can communicate with devices (e.g., computers, storage devices, etc.) over a network.

Figure 3:
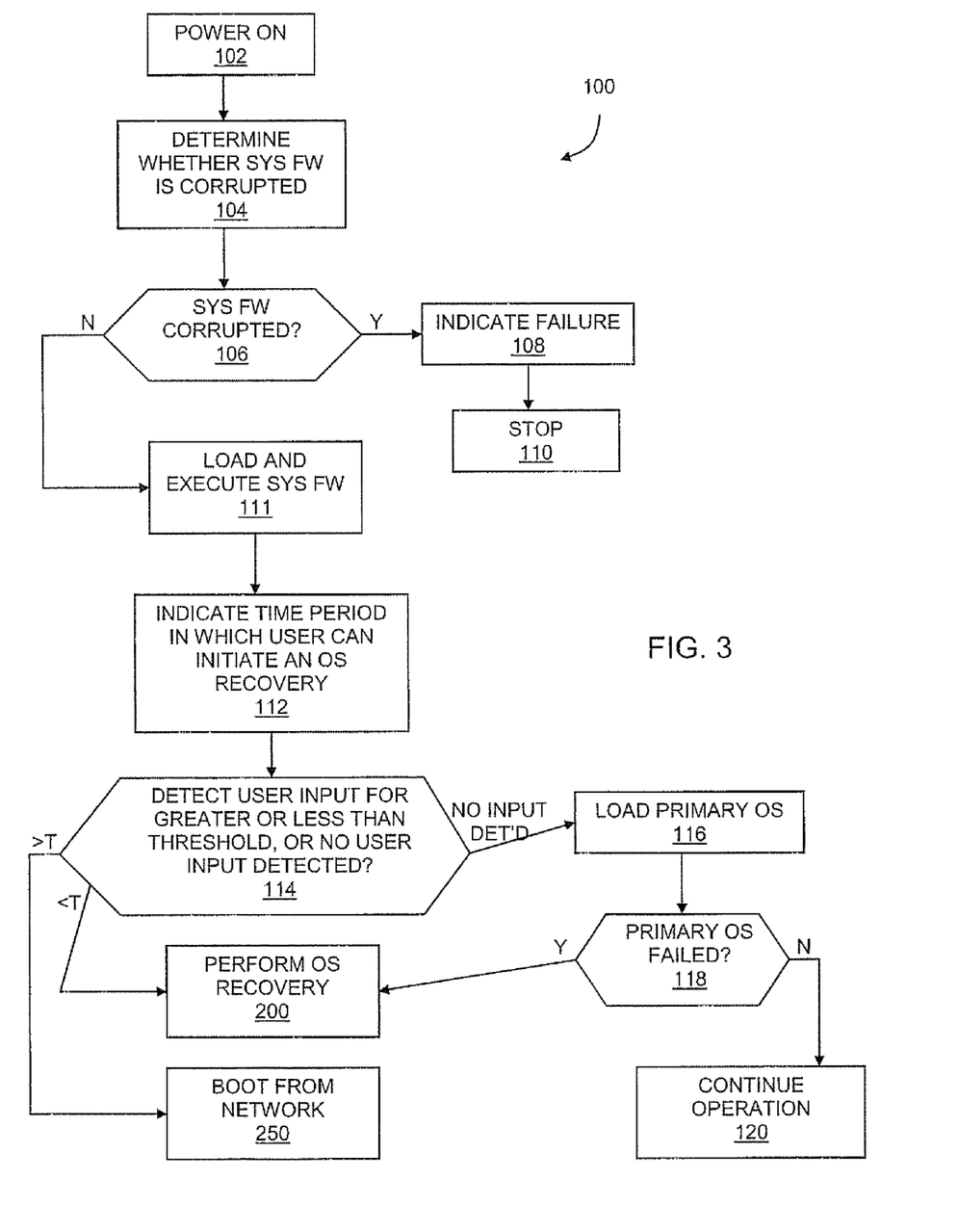
FIG. 3 shows another method operable on the system of FIG. 1.
Figure 4:
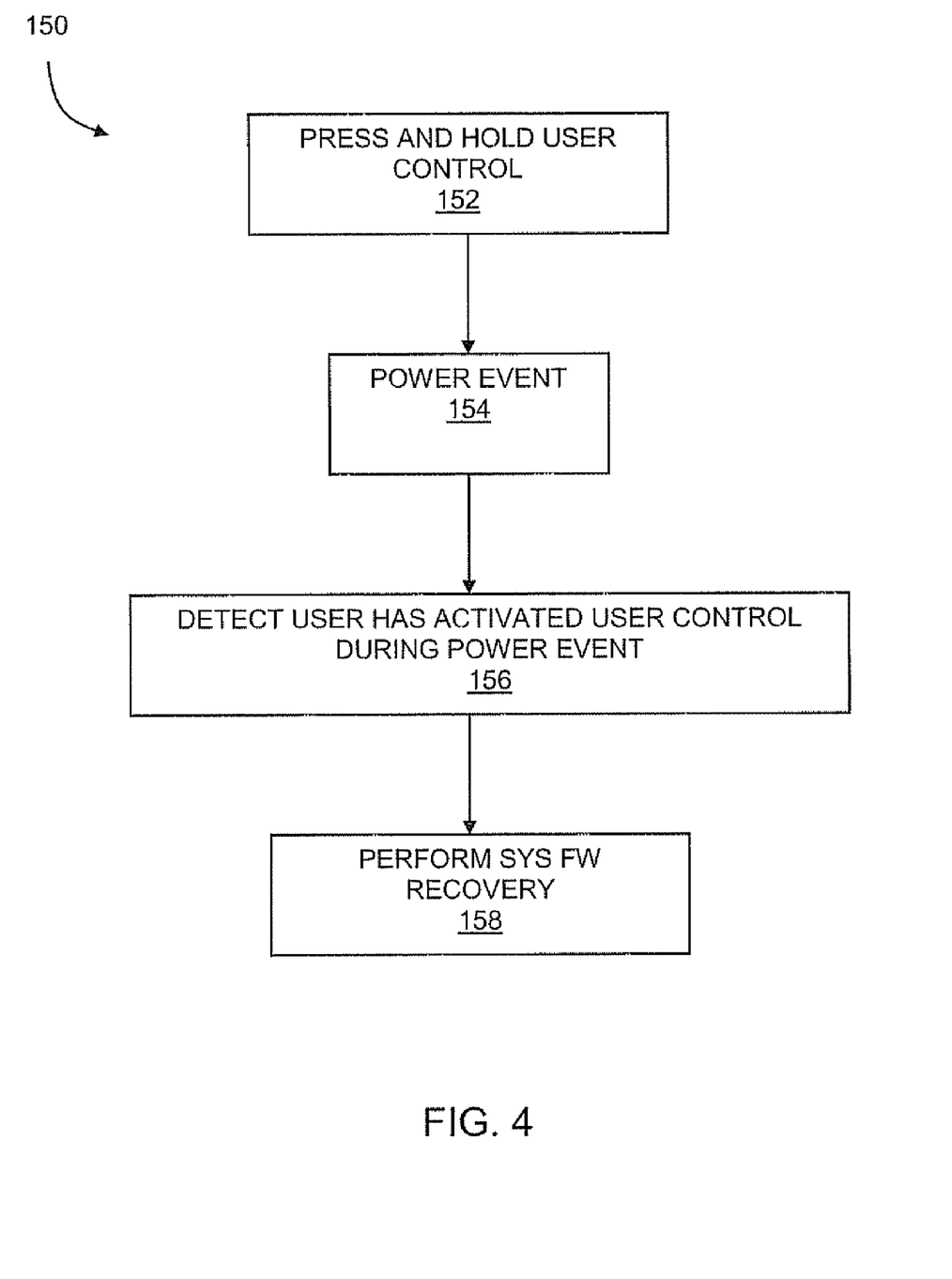
FIG. 4 illustrates a method for initiating system firmware recovery.

FIG. 3 illustrates a method 100 operable on the system 10 in accordance with various embodiments. The method 100 represents the operation of the system 10 during initialization. At 102, method 100 comprises powering on the system 10. Powering on the system 10 can be accomplished, for example, by activating a power button. At 104, the logic 12, by executing code for this purpose, determines whether the system firmware 1 is corrupted. In one embodiment, this action is performed by the logic 12 computing a checksum of some or all of storage 18 and comparing that computed checksum to a known valid value of that checksum. If the checksums do not match, the logic 12 determines that the system firmware 19 is corrupted. If the checksums match, the logic 12 determines that the system firmware is not corrupted. At decision 106, the logic 106 determines whether the system firmware is corrupted. If the system firmware is corrupted, the logic 12 illuminates the indicator 14 at 108 to indicate an error, and at 110, the system 10 ceases the initialization process. In one embodiment, the logic 12 causes the indicator 14 to illuminate red. This indication indicates to the user that the system firmware 19 was determined to be corrupted. FIG. 4 provides an illustrative method for recovering the system firmware and will be described below.

Referring still to FIG. 3, if the system firmware 19 is not corrupted as determined at 106, then at 111, the valid system firmware from storage 18 is loaded and executed by the logic 12. At 112, method 100 further comprises indicating to the user a time period in which the user can manually initiate an operating system recovery. In some embodiments, the logic 12 indicates this time period by causing the indicator 14 to blink, perhaps with alternating colors (blue then red) for a predetermined period of time. The predetermined period of time may be, for example, ten seconds. The ten-second long blinking indicator 14 indicates to the user a time during which the user can force the system 10 to perform one or more operating system-related functions.

During this brief (e.g., ten second) time period, the user has three choices: (a) to let the time period expire without activating the user control 22 at all, (b) to activate the user control for a time less than a threshold, and (c) to activate the user control for a time greater than a threshold. The threshold may be eight seconds in some embodiments. At 114, the logic 12 detects whether the user activated the user control 22 for greater than or less than the threshold, or whether the user activated the user control 22 at all. If the user did not activate the user control 22 during the ten-second time period specified by the indicator 14, control passes to 116 at which the primary operating system 25 is loaded and executed. At 118, if the primary operating system loaded without failure, then system initialization ends and normal system operation continues at 120. The indicator 14, at this point, may be illuminated to indicate a successful system initialization (i.e., both system firmware 19 and the primary operating system 25 successfully loaded). In some embodiments, the indicator may be illuminated a constant (i.e., no blinking) green to indicate successful system initialization.

Figure 5:
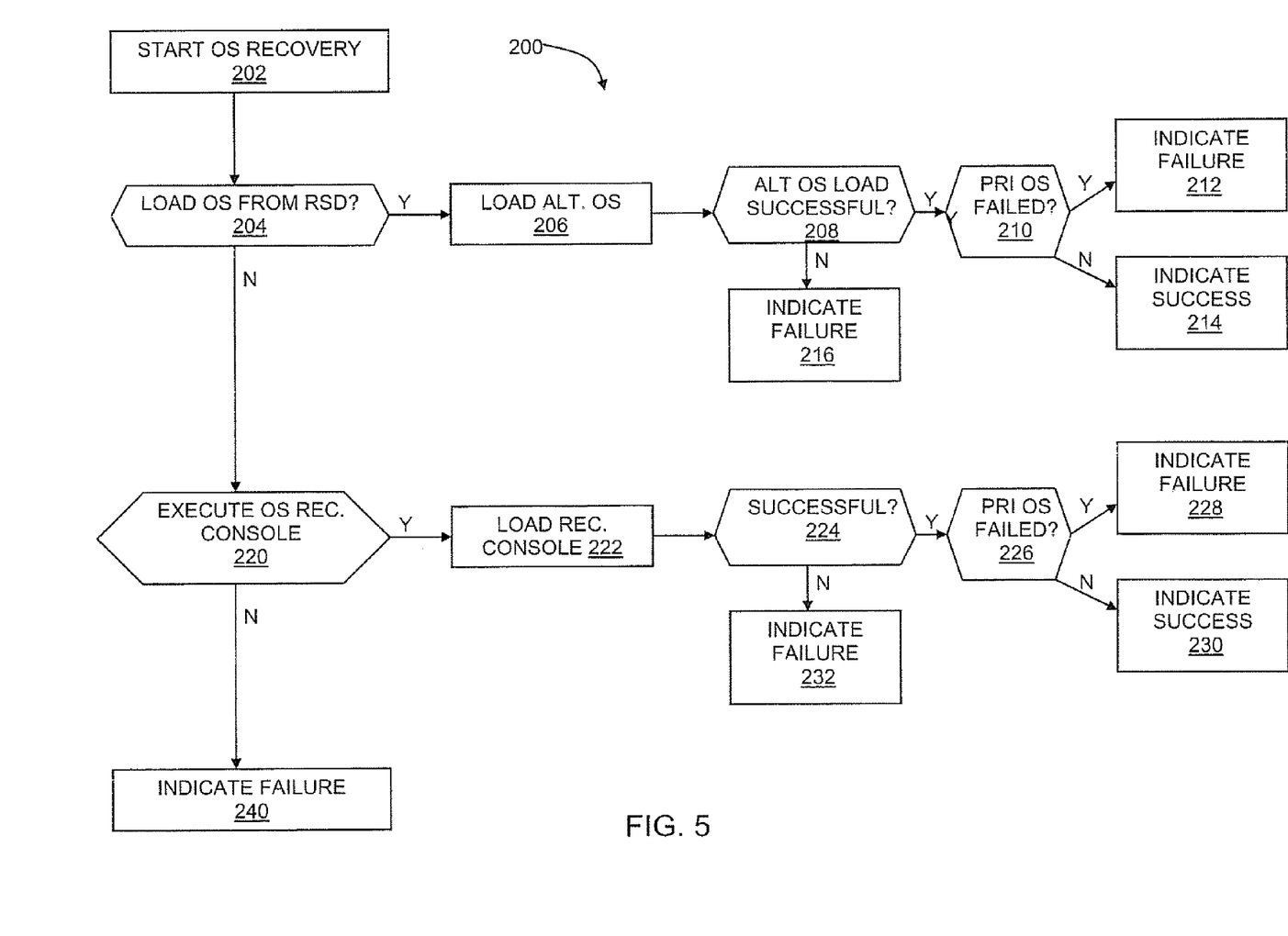
FIG. 5 illustrates a method for initiating operating system recovery.
Figure 6:
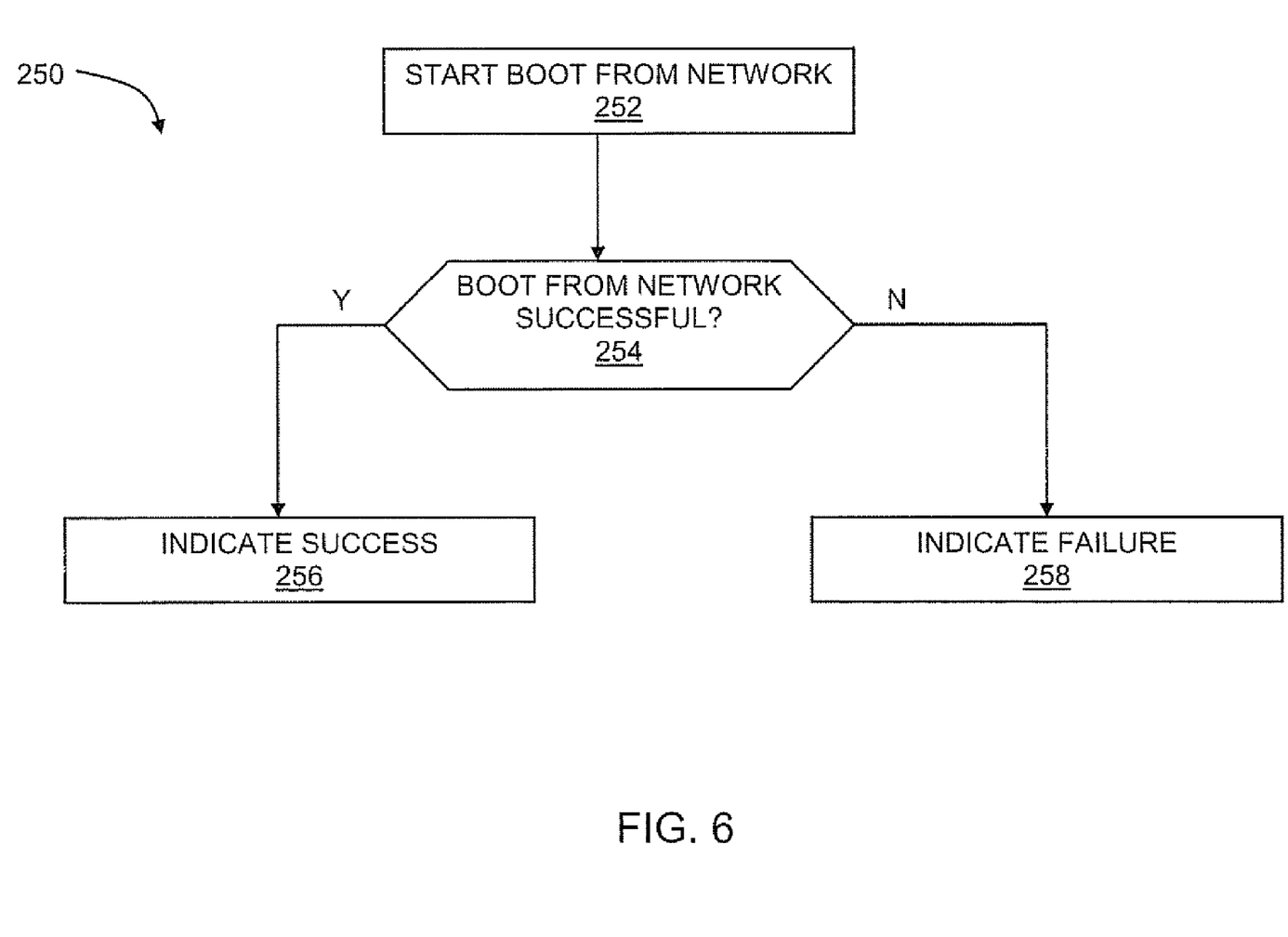
FIG. 6 illustrates a method for initiating a boot from a network.

Referring back to decision 114, if the user activates the user control 22 for less than the threshold period of time (e.g., eight seconds), then an operating system recovery is performed at 200 (an example of which is depicted in FIG. 5). If the user activates the user control 22 for greater than the threshold period of time, then the system is caused to boot from a network (an example of which is depicted in FIG. 6).

As noted above, the indicator 14 may be illuminated at 108 to indicate to the user that the system firmware 19 was determined to be corrupted. FIG. 4 illustrates a method 150 by which the user can cause the system to perform a system firmware recovery process. A complication is that the system 10 is headless and thus a computer keyboard, mouse, trackball, and monitor are not provided to facilitate the user executing a system firmware recovery process. In accordance with various embodiments, the user causes the system 10 to initiate the system firmware recovery process by pressing and holding down the user control 22 (152) while causing a power event to occur (154). The power event may comprise activating a power switch to turn power on to the system's electronics. At 156, the method further comprises detecting that a power event has occurred while the user has activated the user control. Detecting this combination of actions (i.e., concurrent power event and user control activation) causes the logic 12 to force a system firmware recovery process to occur (158).

To perform the system firmware recovery process, the logic 12 causes the currently unavailable storage 26 to be made available. Making the storage 26 available comprises activating the power switch 34 to provide power to the storage 26 and/or asserting the EN/DIS control signal 38 to the EN input terminal 39 of the storage 26 depending on which mechanisms are implemented as described above with regard to FIGS. 1A-1C. Once the storage 26 is made available, the system firmware recovery console 34 can be executed to recover the system firmware.

As explained above, the system firmware recovery process comprises, in one embodiment, overwriting the system firmware 19 in storage 18 with the copy 28 of the system firmware from storage 26. In another embodiment, the system firmware recovery process comprises redirecting the logic 12 to load and execute the system firmware copy 28 from storage 26 rather than the system firmware 19 from storage 18 in the Flash memory 18, and thus not re-flashing storage 18 with the system firmware copy 28.

FIG. 5 provides an illustrative embodiment of the method 200 in which an OS recovery is initiated and performed. The start of the OS recovery method 200 is illustrated at 202. As described above regarding FIG. 3, the OS recovery 200 is initiated in one of two ways in various embodiments. The user can force an operating system recovery to be performed by activating the user control 22 for less than the threshold time period while the indicator 14 blinks (112) during system initialization. Alternatively, if a failure of the load of the primary operating system occurs, the OS recovery method 200 is performed. Accordingly, at 202 in FIG. 2, loading of the primary operating system may or may not have failed.

The operating system can be recovered in multiple ways. For instance a removable storage device (e.g., USB device) comprising an operating system can be coupled to port 16. Method 200 determines whether such a removable storage device is present and contains a bootable operating system. If a storage device is present at port 16 and does contain a bootable operating system, then the logic 12 attempts to load this alternative operating system at 206. The load of the alternative operating system may or may not be successful as determined at 208. If the load of the alternative operating system is successful, then if the load of the primary operating system 25 had failed (as determined at 210), the indicator 14 is caused to indicate a failure at 212. Upon seeing the indication of a failure via indicator 14, using a button assistance device (e.g., paperclip), a user can activate the user control 22. As a result, the logic 12 causes the indicator 14 to indicate the nature of the error. In this case, the error is that the primary operating system failed to load. This particular error code can be indicated in any suitable manner such as by the color of the indicator 14 or a particular blinking pattern of the indicator.

If, at 210, logic 12 determines that the primary operating system had not failed (indicative of the user desiring to have the system 10 load the alternative operating system for a reason other than as a result of a failure of the primary operating system), then an indication of a successful operating system load is provided to the user at 214 by, for example, illuminating indicator 14. The user can activate the user control 22 using the button assistance device to have the logic 12 visually indicate (214) that the alternative operating system, not the primary operating system, successfully loaded and that no failure of the primary operating system was detected. This status indication can be indicated in any suitable manner such as by the color of the indicator 14 or a particular blinking pattern of the indicator.

If, at 208, the load of the alternative operating system from the removable storage device failed, then logic 12 illuminates indicator 14 to indicate the occurrence of a failure (216). At this point, it is known that at least the alternative operating system experienced a failure while attempting to load. The primary operating system may also have experienced a failure while attempting to load (as determined at 118 in FIG. 3). Upon seeing the indication of a failure via indicator 14, using a button assistance device, a user can activate the user control 22. As a result, the logic 12 causes the indicator 14 to indicate the nature of the error. In this case, the error is that (a) an error was only detected for the attempted load of the alternative operating system or (b) that failures were detected for the attempted load of both operating systems. The logic 12 causes the indicator to differentiate these two errors. For example, a particular color and/or blinking pattern can be implemented for each such error and the color/blinking pattern can be different between the two errors.

If no removable storage device is present at port 16, or a removable storage device is present but does not have an operating system stored thereon, control passes in method 200 from 204 to 220. At 220, the logic 12 determines whether the operating system recovery console 30 is present in system 10 and, if so, changes the currently unavailable state of the operating system recovery console 30 to be available. Making the storage 26 available, as explained above, comprises activating the power switch 34 to provide power to the storage 26 and/or asserting the EN/DIS control signal 38 to the EN input terminal 39 of the storage 26 depending on which mechanisms are implemented as described above with regard to FIGS. 1A-1C. Once the storage 26 is made available, the operating system recovery console 30 can be executed to recover the system firmware.

If the operating system recovery console 30 is not present (e.g., not physically present on storage 26), the logic 12 causes an error status to be indicated by indicator 14 (240). The user can activate the user control 22 to have the logic 12 specify a particular error code (particular color and/or blinking pattern combination) associated with this error.

If, however, the operating system recovery console 30 is present and the storage 26 has been made available for use, then at 220, the logic attempts to load and execute the operating system recovery console 30 (222). The operating system recovery console 30 causes at least enough of an operating system to load to enable the network interface 20 to be active and usable. Once the network interface 20 is enabled, the logic 12 recovers the system's operating system via a network and thus from a source external to the system.

At 224, method 200 comprises determining whether the operating system recovery process of 222 was successful. If the recovery process was successful, then, after determining at 226 that an attempted load of the primary operating system had failed, an error status is indicated on indicator 14 (228). The user can activate the user control 22 using the button assistance device to have the logic 12 visually indicate (by color and/or blinking pattern) the nature of the error (failed primary operating system load, successful recovery using recovery console 30). If the primary operating system was not determined to have failed during an attempted load, the logic causes the indicator 14 to indicate a successful operating system recovery at 230. Again, the user can activate the user control to have the logic indicate, via indicator 14, that the operating system recovery console was successful in loading a new operating and that no error associated with the primary operating system was detected. If, at 224, the logic 12 determines that the operating system recovery console 30 was not successful in recovering the operating system from a source external to the system 12, then at 232 an error status is indicated on indicator 14. The user can have an error code visually provided to the user via the indicator (e.g., by color or blinking pattern).

FIG. 6 provides an illustrative implementation of how the system 10 boots from the network (element 250 in FIG. 3). At 252, the logic 12 starts the process of booting from the network via the network interface 20. Booting from the network comprises, for example, loading a minimal, in some embodiments, operating system and configuring a minimal, in some embodiments, network interface to enable the restore of the NAS device. At 254, the logic 12 determines whether the network boot from 252 completed successfully. If the network boot was successful, then at 256 the logic 12 provides an indication of a successful network boot via indicator 14. If the network boot was not successful, then at 258 the logic 12 provides an error indication via indicator 14. The user can activate the user control 22 to have the logic 12 specify the nature of the error via any of the aforementioned techniques (particular color of the indicator, blinking pattern, etc.).

After either or both of the operating system recovery console 30 and the system firmware console 34 have been used to recover the operating system and/or system firmware, the logic 12 causes the storage 26 to again be rendered unavailable.

In other embodiments, one of the hard disk drives 24 (which comprises a storage device) comprises a backup operating system. The hard disk drive 24 with the backup operating system is rendered unavailable (for security or other reasons) using any of the aforementioned techniques for rendering the storage 26 unavailable. When use of the backup operating system is desired (e.g., during an operating system recovery), the logic 12 causes the hard disk drive with the backup operating system to be made available. At that point, the system 10 can proceed using the backup operating system as the main operating system or reconstruct a new operating system on another hard disk drive 24, after which the hard disk drive comprising the backup operating system is again made unavailable.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a user input control;
   a storage device comprising code that is executable to cause recovery of at least one of an operating system and system firmware; and
   logic coupled to said user input control and to said storage device, said logic differentiates different types of user requests via said user input control based, wherein said logic identifies a first user request based on a user activating the user input control for less than a threshold period of time, and said logic identifies a second user request based on a user activating the user input control for more than the threshold period of time, the first user request being a request to recover one of the operating system or system firmware and the second user request being a request to recover the other of the operating system or system firmware;
   wherein said logic causes said storage device to be unusable until either the first or second request is identified.

2. The system of claim 1 wherein said logic causes said storage device to be unusable by causing power to be turned off to said storage device.

3. The system of claim 1 further comprising a power switch coupled to said logic wherein said logic asserts a control signal to said power switch to cause said power switch to turn power off to said storage device.

4. The system of claim 1 wherein said logic causes said storage device to be unusable by causing said storage device to enter a disabled state.

5. The system of claim 1 wherein said logic causes said storage device to be unusable by asserting a control signal to an input terminal of said storage device.

6. The system of claim 1 wherein said logic causes said storage device to be usable upon an occurrence of either of the first or second requests.

7. The system of claim 6 wherein said logic causes said storage device to be usable by enabling power to said storage device.

8. The system of claim 6 wherein said logic causes said storage device to be usable by asserting a control signal that causes said storage device to enter an enabled state.

9. The system of claim 1 wherein said logic causes said storage device to be unusable by causing power to be turned off to said storage device and by causing said storage device to enter a disabled state.

10. The system of claim 1 wherein said user input control does not comprise any of a keyboard, mouse, trackball, and computer monitor.

11. The system of claim 1 wherein said system comprises a network-attached storage device.

12. A system, comprising:
a non-volatile storage device comprising at least one of an operating system and system firmware; and
logic coupled to said storage device that causes said storage device to be unusable until a request is provided to recover an operating system or system firmware, the logic determining whether a user has activated a user input control for more or less than a threshold period of time and identifying the request as a request to recover one of the operating system or system firmware when the user input control has been activated for more than the threshold period of time and identifying the request as a request to recover the other of the operating system or system firmware when the user input control has been activated for less than the threshold period of time.

13. The system of claim 12 further comprising additional storage that comprises code that is executable to cause said non-volatile storage device to be usable upon an occurrence of the request to recover.

14. The system of claim 12 wherein said non-volatile storage comprises a hard disk drive.

15. The system of claim 12 wherein said logic causes said non-volatile storage device to be unusable by causing power to be turned off to said non-volatile storage device.

16. The system of claim 12 wherein said logic causes said non-volatile storage device to be unusable by causing said non-volatile storage device to enter a disabled state.

17. The system of claim 12 wherein said logic independently causes said non-volatile storage device and said additional storage to be unusable until the request is provided to rebuild.

18. The system of claim 12 wherein the user input control does not comprise any of a keyboard, mouse, trackball, and computer monitor.

19. A method, comprising:
detecting a first user request based on a user activating an input control for more than a threshold time period, said first user request being a request to recover one of an operating system and system firmware;
detecting a second user request based on the user activating the input control for less than a threshold time period, said second user request being a request to recover the other of the operating system and system firmware;
in response to detection of said first or second request, causing a storage device comprising code that performs a recovery of at least one of the operating system and system firmware to transition from an unusable state to a usable state; and
performing said requested recovery commensurate with the detected first or second request.

20. The method of claim 19 wherein receiving said request comprises detecting a user input from a user control that does not comprise a keyboard, mouse or trackball.

* * * * *